Figure 1:
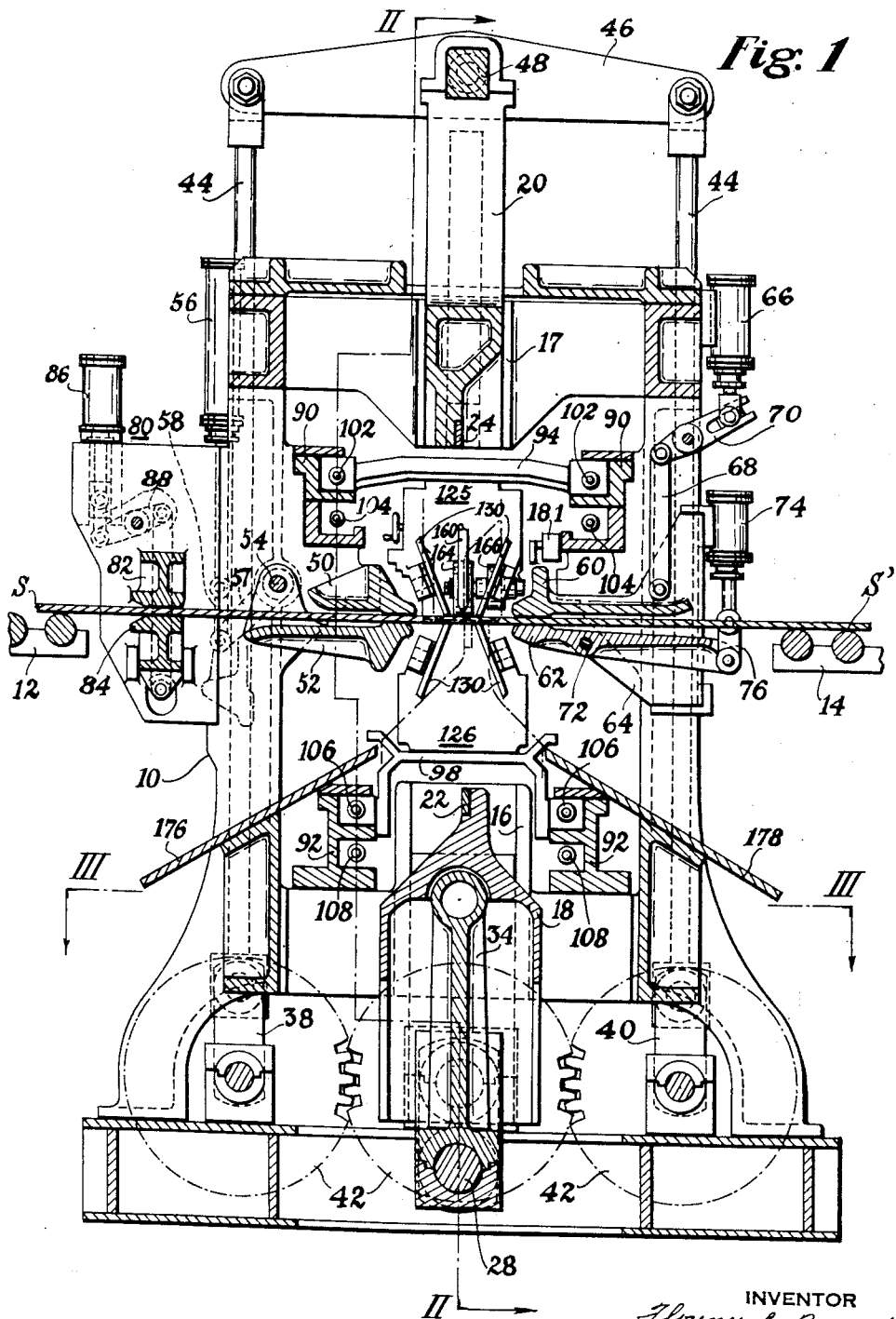

Jan. 17, 1939.  F. C. BIGGERT, JR  2,143,969
METHOD AND APPARATUS FOR WELDING STRIP END TO END
Filed June 29, 1937  5 Sheets-Sheet 1

INVENTOR
Florence C. Biggert Jr
BY Brown, Critchlow
& Flick
his ATTORNEYS

Jan. 17, 1939.    F. C. BIGGERT, JR    2,143,969
METHOD AND APPARATUS FOR WELDING STRIP END TO END
Filed June 29, 1937    5 Sheets-Sheet 2

INVENTOR
Florence C. Biggert Jr
BY Brown Critchlow &
Flick
his ATTORNEYS

Jan. 17, 1939. F. C. BIGGERT, JR 2,143,969
METHOD AND APPARATUS FOR WELDING STRIP END TO END
Filed June 29, 1937 5 Sheets-Sheet 4

INVENTOR
Florence C. Biggert Jr
BY Brown Critchlow
+ Flesh
His ATTORNEYS

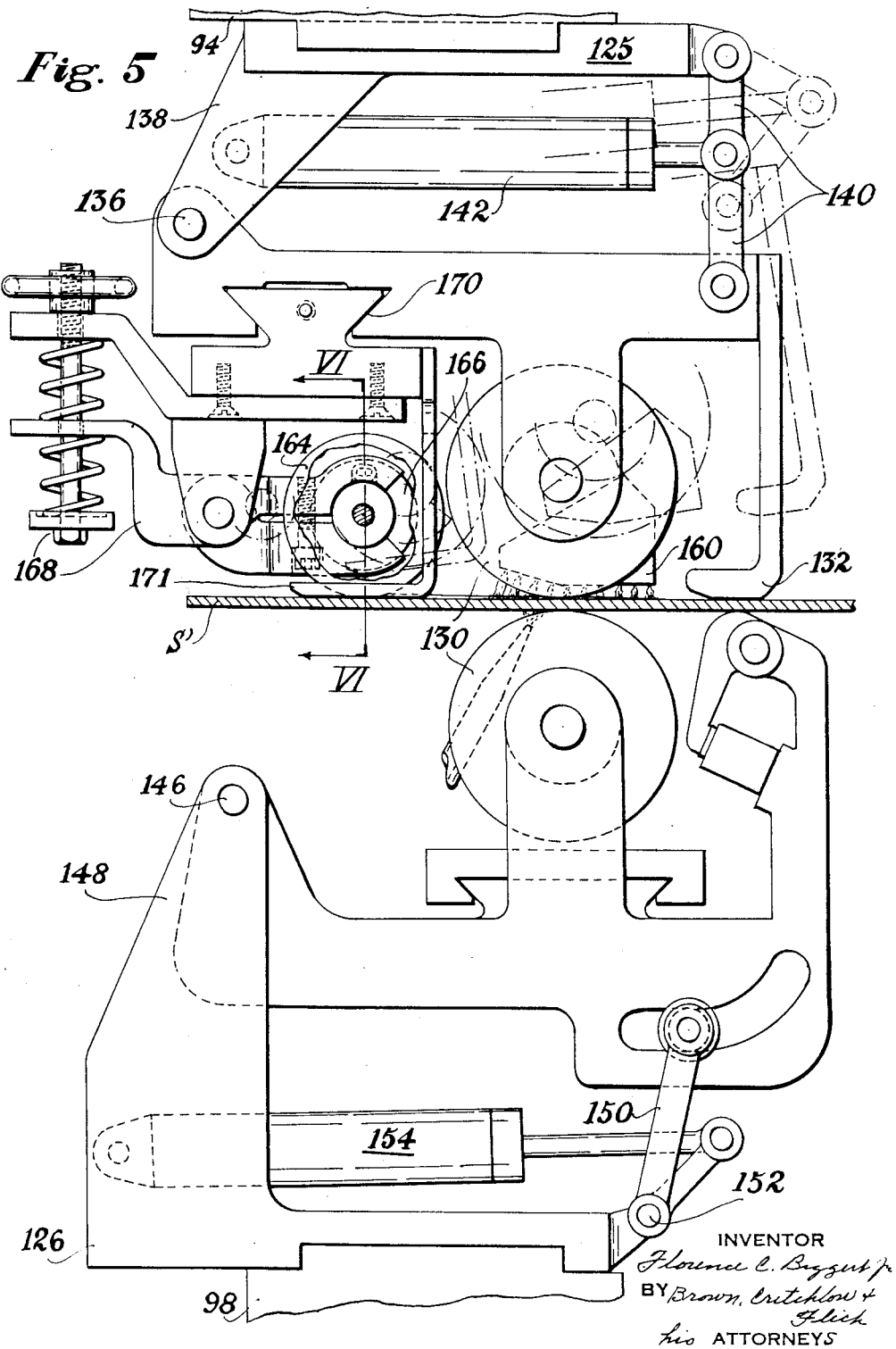

Patented Jan. 17, 1939

2,143,969

UNITED STATES PATENT OFFICE 2,143,969

METHOD AND APPARATUS FOR WELDING STRIP END TO END

Florence C. Biggert, Jr., Crafton, Pa., assignor to United Engineering & Foundry Company, Pittsburgh, Pa., a corporation of Pennsylvania Application June 29, 1937, Serial No. 150,904

22 Claims. (Cl. 29—33)

This invention relates to joining metal strips end to end to form a composite strip and more particularly is concerned with methods and apparatus for butt-welding metal strip end to end and for trimming flash from the line of weld.

It is the general object of my invention to provide improved methods and apparatus for butt-welding metal strip together and for trimming the flash therefrom, which methods and apparatus are particularly adapted to efficient commercial strip production.

Another object of my invention is to provide an improved apparatus for trimming the ends of metal strips to prepare them for welding and including means for butt-welding the strips and for immediately removing the flash from the line of weld, which apparatus is readily and rapidly operable and which is relatively inexpensive to construct and maintain, and which takes a minimum of floor space.

Another object of my invention is the provision of improved methods and apparatus for butt-welding metal strip end to end and for progressively trimming the flash from the line of weld during at least a part of the welding operation.

The foregoing and other objects of my invention are achieved by the provision of apparatus including means for clamping the strip ends in substantially aligned relation, a pair of cooperating shear blades for trimming the ends of the strips to prepare them for welding, and means for moving the blades to shearing relation and to a position spaced vertically above and below the strip a sufficient distance therefrom to permit the entry of strip welding means. Completing the combination are strip welding means, means mounting the strip welding means for movement between the shear blades when in the retarded position to weld the strip progressively, and means mounted on the welding means for progressively trimming the flash from the welded seam.

My improved method of joining metal strip end to end comprises clamping the ends of the strips to be joined together in aligned relation, shearing the strip ends to prepare them for welding, progressively welding the strips end to end, and progressively trimming the flash from the welded seam during at least part of the progressive welding.

Figure 2:
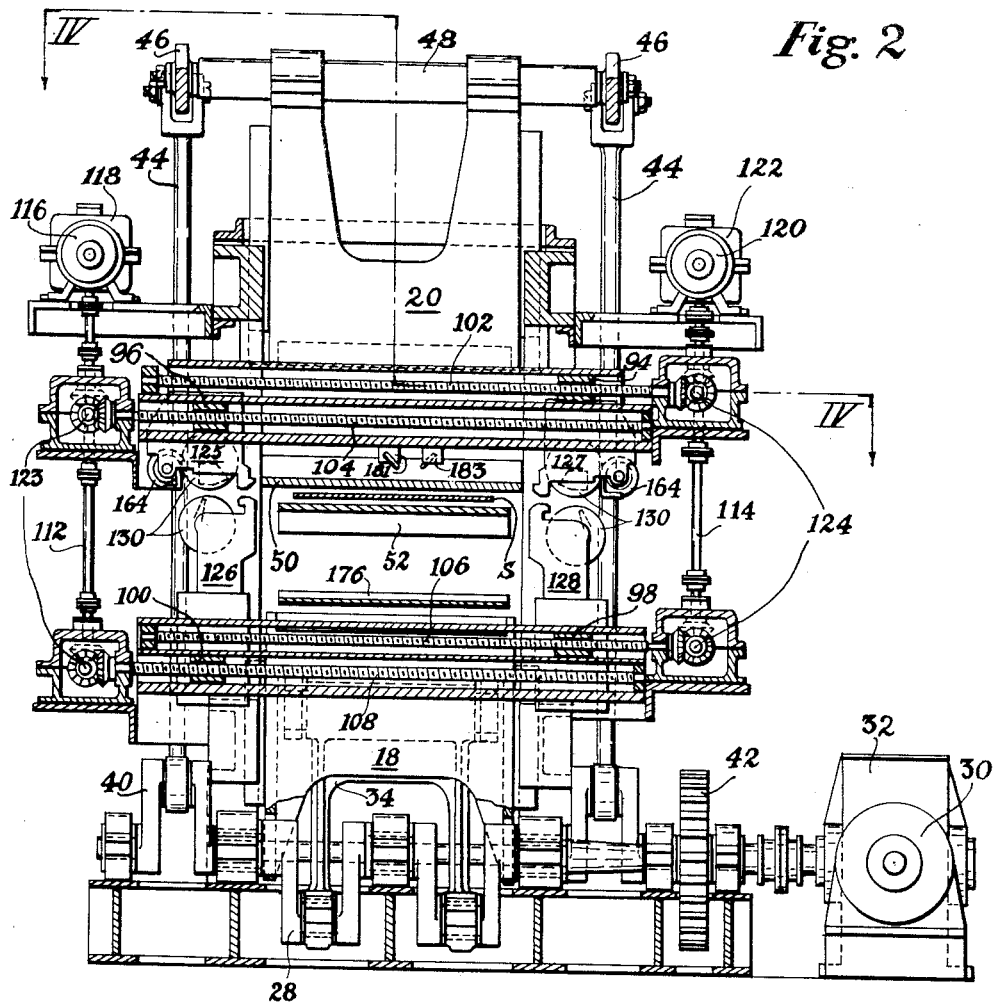
Figure 3:
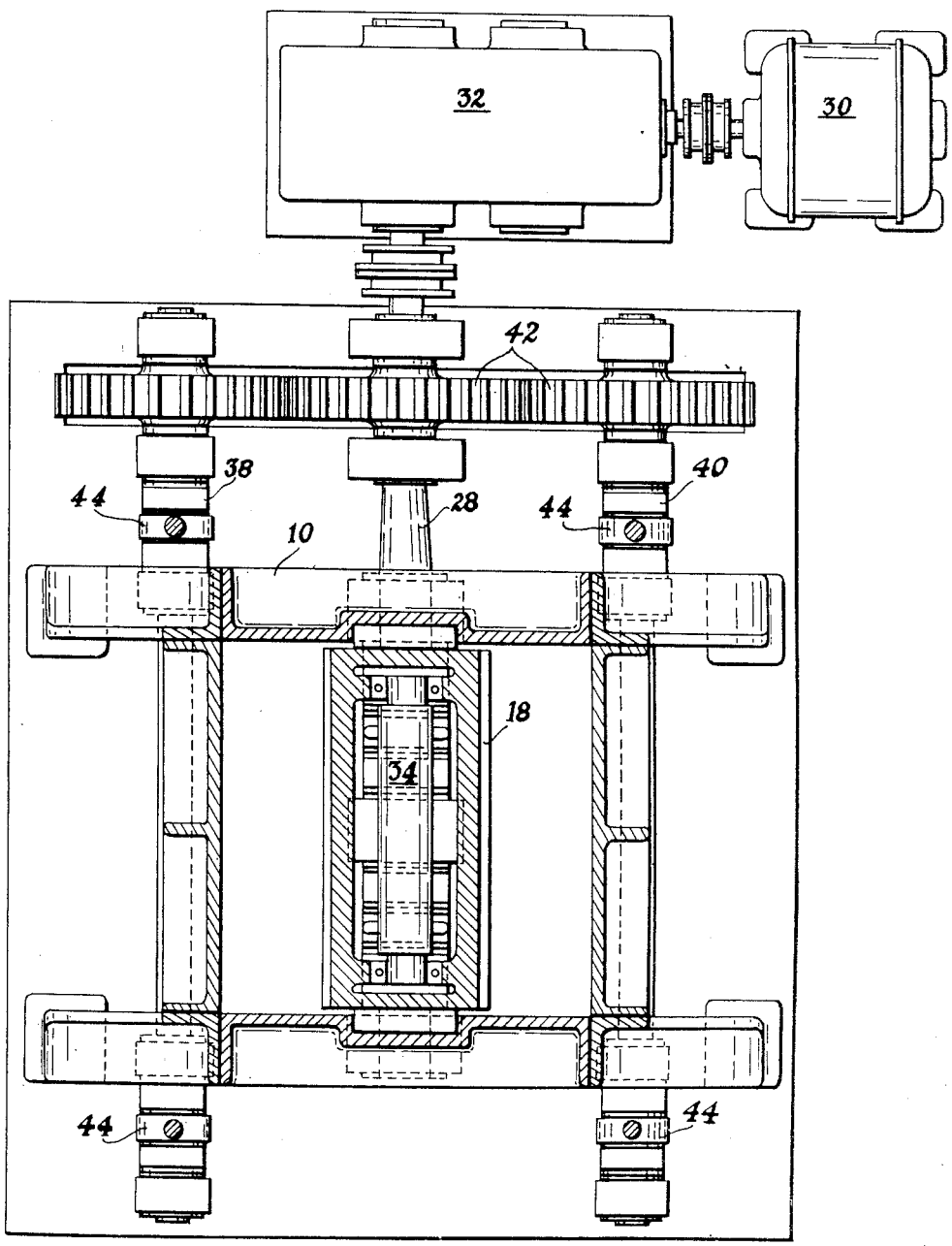
Figure 4:
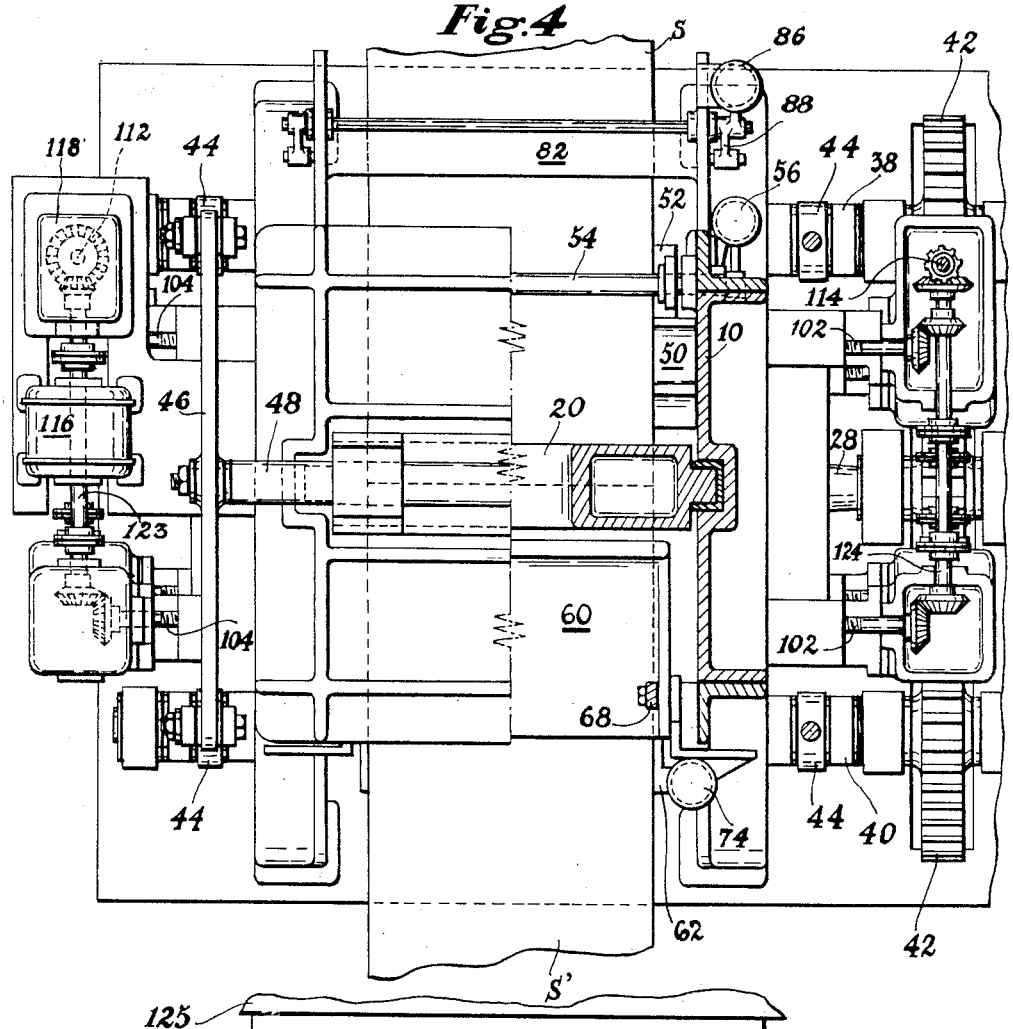
Figure 6:
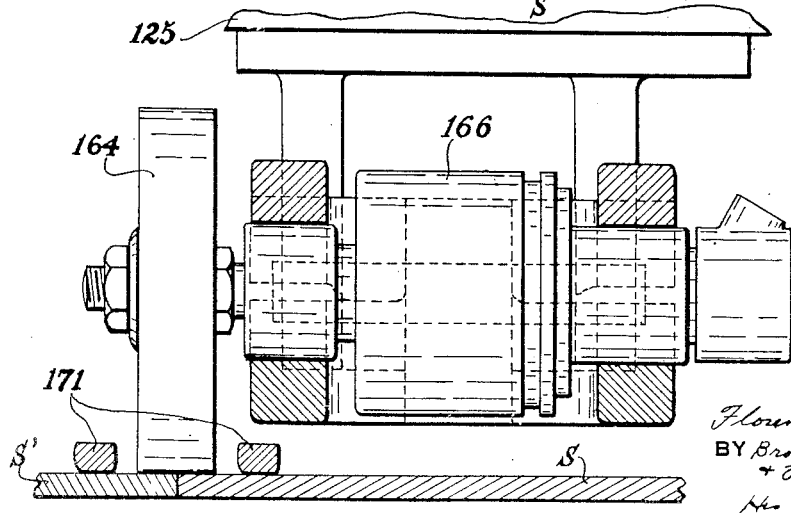

Referring to the accompanying drawings, Fig. 1 is a vertical longitudinal cross-sectional view of apparatus comprising one embodiment of my invention; Fig. 2 is a transverse vertical cross-sectional view taken on line II—II of Fig. 1; Fig. 3 is a horizontal cross-sectional view taken on line III—III of Fig. 1; Fig. 4 is a horizontal cross-sectional view taken on line IV—IV of Fig. 2; Fig. 5 is an enlarged view of the welding head and flash trimming means indicated generally in Fig. 2; and Fig. 6 is a vertical cross-sectional view taken on line VI—VI of Fig. 5.

In the accompanying drawings, the numeral 10 indicates generally a frame adapted to be positioned so as to receive the ends of metal strips indicated at S and S' which are adapted to be joined together by the apparatus. The strips S and S' are fed to and from the apparatus in any suitable manner as on conveyors, indicated generally at 12 and 14, and are moved on the conveyors by coilers, pinch rolls, or rolling mill equipment, as will be understood by those skilled in the art.

The frame 10 is formed with vertical guides 16 and 17 which slidably receive a lower knife-block 18 and an upper knife-block 20 which carry, respectively, shear blades 22 and 24 which are complemental to each other and adapted to shear the ends of the strips to prepare them for welding, as hereinafter described. The knife-block 18 is moved vertically in the guides 16 and 17 by a crank-shaft 28 which is driven from a motor 30 connected to the crank-shaft, as by a gear box 32. The crank-shaft 28 is pivotally secured to the knife-block 18 by a connecting rod 34. The knife-block 20 is likewise reciprocated vertically and this is accomplished by providing crank-shafts 38 and 40 on the frame 10 which are geared to the crank-shaft 28 by gears indicated generally at 42. Connecting rods 44 carried by the crank-shafts 38 and 40 are pivotally fastened at their upper ends to cross arms 46 which are pivotally mounted upon a beam 48 secured to the top of the knife-block 20.

By the mechanism just described the shear blades 22 and 24 can be moved from the full-line position shown in Fig. 1 into a position in working relation with each other. This arrangement of parts permits welding apparatus to be moved into welding relation with the strip ends when the shear blades are in their full-line position. During the shearing and welding operation the strip ends S and S' are clamped by suitable mechanism which, in the embodiment of the invention illustrated, includes a fixed clamping jaw 50 mounted transversely of the frame 10 and positioned just above the plane of the strip end S. Associated with the clamping jaw 50 is a jaw 52 which is pivotally mounted upon a shaft 54 carried by the frame 10. The jaw 52 is moved about the shaft 54 from the full-line to the dotted-line position by any suitable means, such as a fluid pressure motor 56 which is pivotally connected to an arm 57 on the jaw by a link 58.

The strip S' is clamped by a pair of jaws 60 and 62 which are mounted in a bracket 64 slidably carried in suitable ways on the frame 10 for vertical movement whereby the jaws can be moved completely out of the path of the strip and so as to permit the crop or other end to be sheared from the strip end S. The bracket 64 is moved vertically by a fluid pressure motor 66 which is operatively connected thereto by a link 68 and a lever 70 pivoted upon the frame 10. With the bracket 64 in its lowermost position the jaw 60 is substantially in engagement with the upper surface of the strip S'. The jaw 62 is pivotally carried upon a shaft 72 supported on the bracket 64 and a fluid pressure motor 74 carried by the bracket and connected through a link 76 with the jaw 62 effects clamping movement of the jaws together.

I may provide an additional clamping mechanism shown generally at 80 at one end of the frame 10 to assist in clamping the strip. This mechanism includes jaws 82 and 84 at least one of which, ordinarily the bottom, is moved toward and from the other by a fluid pressure motor 86 operating through appropriate linkage 88.

Extending transversely of the frame 10 are guides 90 and 92 which slidably receive carriages 94, 96, 98 and 100. The position of the carriage 94 is controlled by threaded shafts 102, that of the carriage 96 by threaded shafts 104, that of the carriage 98 by threaded shafts 106 and that of the carriage 100 by threaded shafts 108. All of the threaded shafts are journaled at their ends in suitable bearings carried by the frame 10 and the shafts are adapted to be driven by vertical shafting 112 and 114 connected, respectively, to motors 116 and 120 through appropriate reduction gear boxes 118 and 122 and horizontal shafts 123 and 124. The carriages 94 and 98 are adapted to be moved towards each other laterally of the strip and the carriages 96 and 100 are moved in unison therewith.

Each of the carriages supports a head, which heads have been indicated, respectively, by the numerals 125, 126, 127 and 128. The heads 125 and 126 cooperate with each other as do the heads 127 and 128 to perform a welding operation upon the strip. I contemplate employing any desired kind of welding heads, as for example electric arc, or gas, but in the embodiment of my invention shown I have illustrated gas welding heads which are shown in detail in Figs. 5 and 6. Each of the heads includes rollers 130 which, as best seen in Fig. 1, engage with the strip at both sides of the line of weld, and also above and below the strip to support it during the welding operation. To further support the strip ends in the proper relation for welding, preferably each head carries a shoe or guide 132.

The upper heads 125 and 127 are mounted for movement to and from operating relation with the strip and this is provided for by pivotally securing the head to a shaft 136 mounted on a bracket 138 secured to the associated carriage. The other end of the head is connected by toggle linkage 140 to the carriage and a fluid pressure motor 142 pivotally connected to the bracket 138 operates the toggle linkage to raise or lower the head into welding relation with the strip. The heads 126 and 128 may likewise be mounted for movement to and from the strip and, in the form of my invention illustrated, this is accomplished by pivotally securing each head to a pin 146 mounted on a bracket 148 secured to the associated carriage. The other end of the head is supported by a bell-crank lever 150 pivotally carried as at 152 on the carriage 98 and operable by a fluid pressure motor 154 pivotally secured to the carriage 100.

The heads 125 and 127 include welding nozzles 160 which are positioned, as seen in Figs. 1 and 5, between the rollers 130 and, in the movement of the heads across the strip, passing just above the strip along the line of weld. Since this part of the apparatus comprises no part of my invention except in combination, and is old per se, it will not be described in greater detail.

Incorporated with the heads 125 and 127 are means for trimming the flash from the welded seam. These means include a grinding wheel 164 which is rotated in any suitable manner, as by a motor 166, and the wheel is mounted for adjustable vertical and lateral movement as by the provision of mechanism indicated, respectively, at 168 and 170. Associated with each grinding wheel is a guard or shoe 171 which engages with the strip at the sides of the line of weld to hold the strip properly during the flash-removing operation.

In the operation of the apparatus as just described, the clamping jaws 82 and 84, and 50 and 52 are opened and in this position the jaw 52 is in the dotted-line showing. The jaws 60 and 62 are likewise opened and the end of the strip S' is introduced therebetween and is clamped in the proper aligned relation by operation of the fluid pressure motor 74 with the end of the strip extending beyond the center line of the shears. The knife-blocks 18 and 20 carrying the shear blades 22 and 24 are now brought vertically together by operation of the motor 30 and through the associated crank-shafts and connecting rods heretofore described so that the crop or other end of the strip is sheared off to prepare the strip end for welding. The crop or other end sheared from the strip falls down on the chute 176 and is not interfered with by the jaw 52. The knife-blocks 18 and 20 are returned to their full-line position and the bracket 64 is raised vertically by operation of the fluid pressure motor 66 to move the end of the strip S' out of the way.

The end of the strip S is now introduced between the clamping jaws 82 and 84 and between the jaws 50 and 52 with the crop or other end of the strip extending beyond the center line of the shear blades. Jaws 82 and 84 are clamped about the strip when in the proper aligned position by the operation of the fluid pressure motor 86, and the jaws 50 and 52 are clamped about the strip by the operation of the fluid pressure motor 56. The crop or other end of the strip is now removed by the operation of the shear blades 22 and 24 which are brought together by the motor, as heretofore described. The crop or other end sheared from the strip S is free to fall down upon the chute 178 and out of the apparatus.

After both ends of the strip have been prepared for welding, as just described, the cross-heads 18 and 20 are positioned in their full line showings of Fig. 1 and the bracket 64 is lowered to bring the strip ends in alignment for welding. The carriages 94, 96, 98 and 100 are now moved laterally by motors 116 and 120 to bring the heads into position over and below the strip adjacent the substantially abutting edges to be joined together and the heads are moved into welding position by the operation of the fluid pressure motors 142 and 154. The welding torches 160 are now started, preferably by well known automatic means, and continued movement of the carriages by the motors 116 and 120 effects a progressive welding of the strip ends together.

As will be recognized, the welding progresses inwardly from the lateral edges of the strip and I particularly contemplate the provision of limit switches 181 and 183 for controlling the operation of the motors 116 and 120. In this connection, the limit switches controlling the operation of the motor 116 should be positioned so as to be engaged by the carriage 94 or the carriage 98 just before these carriages have reached the center of the strip to be welded. The limit switches reverse the motor 116 and return the heads 125 and 126 to their full line position shown in Fig. 2. The limit switches controlling the operation of the motor 120 are positioned just beyond the center line of the strip so that the welding movement of the heads 127 and 128 continues beyond the center of the strip so that the strip is welded completely across its width, with one set of welding heads continuing to operate longer than the other set. Engagement of the limit switches with the carriages 96 and 100 reverses the motor 120 and returns the carriages to their full line position shown in Fig. 2. The limit switches operating to reverse the motors 116 and 120 likewise shut off the torches 160 and operate the fluid pressure motors 142 and 154 to move the welding heads away from the strip in the return movement of the carriages to their full line positions. The limit switches and electrical diagram for obtaining exactly the operation just described have not been illustrated in detail since this is well within the province of the ordinary electrician, in view of the foregoing.

During the progressive welding of the strip ends together the rotary grinding wheels 164, carried by the heads 125 and 127, engage with the flash or burr formed in welding and effect its progressive removal. The flash trimming operation is facilitated inasmuch as it is performed while the flash is still hot and relatively soft. It will be understood that the flash trimming movement of the heads continues after the weld is completed and the torches 160 are shut off so that the flash is completely removed from the line of weld. After the welding heads are returned to their laterally retarded position shown in Fig. 2 the apparatus is ready for another cycle of operation.

From the foregoing it will be recognized that the objects of my invention have been achieved by the provision of methods and apparatus for effectively welding metal strip end to end and removing the flash from the welded seam. The apparatus requires a minimum amount of floor space and is rapid and effective in operation and adapts itself to commercial production methods.

In the practice of my invention it is possible to employ other than gas welding means, as will be recognized, and a single welding head may be substituted for the plurality of heads illustrated while retaining at least certain of the advantages of my inventive concept. Accordingly, while I have specifically illustrated one embodiment of apparatus incorporating the principles of my invention, it should be appreciated that the invention is not limited thereto or thereby but is defined in the appended claims.

I claim:

1. Apparatus for welding metal strip end to end comprising means for clamping the strip ends in substantially aligned relation, a pair of cooperating shear blades for trimming the ends of strips to prepare them for welding, means for moving the blades to shearing relation and to a position spaced vertically above and below the strip a sufficient distance therefrom to permit the entry of strip welding means, strip welding means, means mounting the strip welding means for movement between the shear blades to weld the strip progressively, and means mounted on the welding means for progressively trimming the flash from the welded seam and operating on the seam almost immediately after it is formed.

2. Apparatus for welding metal strip end to end comprising means for clamping the strip ends in substantially aligned relation, a pair of cooperating shear blades for trimming the ends of strips to prepare them for welding, strip welding means, means for moving the blades to shearing relation and to a position spaced above and below the strip a sufficient distance therefrom to permit the entry of the strip welding means therebetween, means mounting the strip welding means for movement between the shear blades to weld the strip progressively, and means for progressively trimming the flash from the welded seam and operating on the seam almost immediately after it is formed.

3. Apparatus for welding metal strip end to end comprising means for clamping the strip ends in substantially aligned relation, a pair of cooperating shear blades for trimming the ends of strips to prepare them for welding, strip welding means, means for moving the blades to shearing relation and to a position spaced above and below the strip a sufficient distance therefrom to permit the entry of the strip welding means therebetween, means mounting the strip welding means for movement between the shear blades to weld the strip progressively, and means for progressively trimming the flash from the welded seam.

4. Apparatus for welding metal strip end to end comprising means for clamping the strip ends in substantially aligned relation, a pair of cooperating shear blades for trimming the ends of strips to prepare them for welding, strip welding means, means for moving the blades to shearing relation and to a position spaced above and below the strip a sufficient distance therefrom to permit the entry of the strip welding means therebetween, and means mounting the strip welding means for movement between the shear blades to weld the strip ends together.

5. Apparatus for welding metal strip end to end comprising means for clamping the strip ends in substantially aligned relation, means for trimming the ends of strips to prepare them for welding, means mounting the trimming means for substantially vertical movement to an out of the way position, strip welding means, and means mounting the strip welding means for movement into operating relation with the strip to weld it together end to end.

6. Apparatus for welding metal strip end to end comprising means for clamping the strip ends in substantially aligned relation, means for trimming the ends of strips to prepare them for welding, means mounting the trimming means for movement to and from an operating position, strip welding means, and means mounting the strip welding means in substantially vertical alignment with the trimming means and for movement into engagement with the strip to weld it together end to end.

7. Apparatus for welding metal strip end to end comprising means for clamping the strip ends in substantially aligned relation, vertically movable means for trimming the ends of strips to prepare them for welding, strip welding means, and means mounting the welding means for movement between the trimming means when in inoperative position to weld the strip together end to end.

8. Apparatus for welding metal strip end to end comprising strip welding means, means mounting the strip welding means for movement to weld the strips together progressively, and means mounted on the welding means for progressively trimming the flash from the welded seam and operating on the seam almost immediately after it is formed.

9. Apparatus for welding metal strip end to end comprising means for clamping the strip ends in substantially aligned relation, vertically movable means for trimming the ends of strips to prepare them for welding, strip welding means, means mounting the welding means for movement between the trimming means when in inoperative position to weld the strip together end to end, and means for trimming the flash from the welded seam and operating on the seam almost immediately after it is formed.

10. Apparatus for welding metal strip end to end comprising means for clamping the strip ends in substantially aligned relation, a plurality of strip welding means, means mounting the strip welding means for simultaneous movement inwardly of the edges of the strips to weld the strips together rapidly but progressively, and means for progressively trimming the flash from the welded seam.

11. That method of forming composite metal strip which comprises clamping the ends of the strips to be joined together in aligned relation, shearing the strip ends to prepare them for welding, progressively welding the strips end to end, and progressively trimming the flash from the welded seam during at least part of the progressive welding operation.

12. That method of forming composite metal strip which comprises shearing the strip ends to prepare them for welding, progressively welding the strips end to end, and progressively trimming the flash from the welded seam during at least part of the progressive welding operation.

13. That method of forming composite metal strip which comprises clamping the ends of the strips to be joined together in aligned relation, shearing the strip ends to prepare them for welding, welding the strips end to end, and trimming the flash from the welded seam during at least part of the welding operation.

14. That method of forming composite metal strip which comprises clamping the ends of the strips to be joined together in aligned relation, shearing the strip ends to prepare them for welding, progressively welding the strips end to end, and progressively trimming the flash from the welded seam.

15. That method of forming composite metal strip which comprises progressively welding the strips end to end, and progressively trimming the flash from the welded seam during at least part of the progressive welding operation.

16. The method of joining metal strip end to end which comprises clamping the ends of the strips to be joined together in aligned relation, shearing the strip ends to prepare them for welding, positioning the strip ends in substantially abutting relation for welding, progressively welding the strip ends together by simultaneously welding from both lateral edges of the strips in toward the center thereof, stopping one welding operation before the center of the strips is reached, continuing the other welding operation past the center of the strips until the weld is complete, and progressively removing the flash from the line of weld almost immediately after the flash is formed and while it is still relatively soft and plastic.

17. The method of joining metal strip end to end which comprises clamping the ends of the strips to be joined together in aligned relation, positioning the strip ends in substantially abutting relation for welding, progressively welding the strip ends together by simultaneously welding from both lateral edges of the strips in toward the center thereof, stopping one welding operation before the center of the strips is reached, continuing the other welding operation past the center of the strips until the weld is complete, and progressively removing the flash from the line of weld almost immediately after the flash is formed and while it is still relatively soft and plastic.

18. The method of joining metal strip end to end which comprises clamping the ends of the strips to be joined together in aligned relation, positioning the strip ends in substantially abutting relation for welding, progressively welding the strip ends together by simultaneously welding from both lateral edges of the strips in toward the center thereof, stopping one welding operation before the center of the strips is reached, and continuing the other welding operation past the center of the strips until the weld is complete.

19. The method of joining metal strip end to end which comprises positioning the strip ends in substantially abutting relation for welding, progressively welding the strip ends together by simultaneously welding from both lateral edges of the strips in toward the center thereof, stopping one welding operation before the center of the strips is reached, and continuing the other welding operation past the center of the strips until the weld is complete.

20. The method of joining metal strip end to end which comprises clamping the ends of the strips to be joined together in aligned relation, positioning the strip ends in substantially abutting relation for welding, progressively welding the strip ends together by simultaneously welding from both lateral edges of the strips in toward the center thereof, and progressively removing the flash from the line of weld almost immediately after the flash is formed and while it is still relatively soft and plastic.

21. Apparatus for welding metal strip end to end comprising strip welding means, means mounting the strip welding means for movement to weld the strips together progressively, and means movable in the path of the welding means for progressively trimming the flash from the welded seam while it is still relatively hot and plastic.

22. Apparatus for welding metal strip end to end comprising strip welding means, means mounting the strip welding means for movement to weld the strips together progressively, and means movable with the welding means for progressively trimming the flash from the welded seam while it is still relatively hot and plastic.

FLORENCE C. BIGGERT, Jr.